Jan. 12, 1943.   J. P. GUINANE   2,308,363
LOOSE LEAF BINDER LOCKING MECHANISM
Filed March 3, 1942
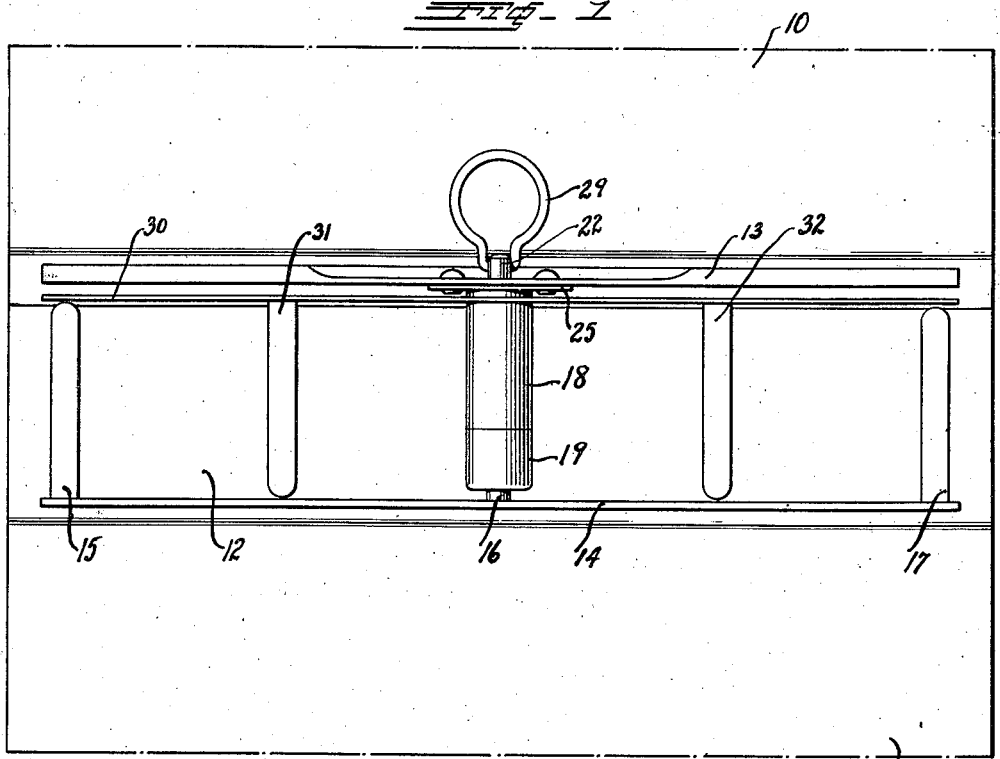
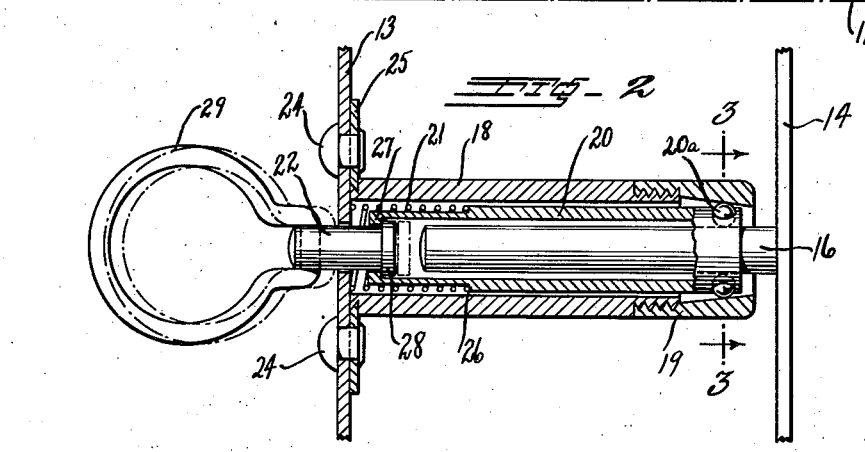
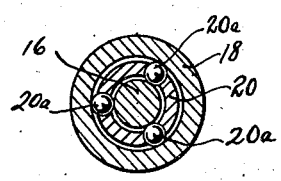
INVENTOR.
James P. Guinane
BY
S. Stephen Baker
ATTORNEY Patented Jan. 12, 1943

2,308,363

UNITED STATES PATENT OFFICE 2,308,363

LOOSE-LEAF BINDER LOCKING MECHANISM

James P. Guinane, New York, N. Y.

Application March 3, 1942, Serial No. 433,161

3 Claims. (Cl. 129—13)

My invention relates to improvements in locking means for loose leaf binders and more particularly to an improvement on the specific locking means described in United States Patent No. 1,869,790 of Aug. 2, 1932.

In said patent, a locking system which may be generally described as a ball wedging device was disclosed. Such a device comprises a post which is locked in a socket by a ball carrier which travels in said socket. The bottom portion of the socket is wedge-shaped so that when the balls are in the narrow portion of the wedge they are clamped against the post. When the ball carrier is lifted to remove the balls from the narrow portion of the wedge, the post is released. A lifting member in the form of a manipulating ring is shown in said patent and said ring is, of course, directly connected to the ball carrier.

Bearing the foregoing in mind, the object of the present invention is to provide such a loose leaf binder wherein danger of jamming is eliminated.

In the drawing, Fig. 1 is a front elevational view of the loose leaf binder posts and locking mechanism.

Fig. 2 is an enlarged, partly sectional view of the locking mechanism.

Fig. 3 is a section on the line 3—3 of Fig. 2.

The loose leaf binder comprises the usual cover members 10 and 11 and the back 12. Horizontal flanges 13 and 14 are formed on the cover members 10 and 11 respectively. Secured to the horizontal flange 14 are binder posts 15, 16 and 17, the posts 16 being telescoped by the locking mechanism hereinafter to be discussed.

The horizontal flange 13 carries the locking mechanism which comprises the socket or tubular casing 18, the wedge portion 19, the ball carrier 20, the expansion spring 21, the ball carrier operating member 22 and the manipulating ring 29.

The socket 18 is secured to the flange 13 by means of rivets 24, the plate 25 being nested in the socket 18, as shown in Fig. 2. The wedge portion 19 is threaded on the socket 18, being made separable because the wedge faces thereof require special hardening treatment which need not be accorded the remainder of the mechanism.

Ball carrier 20 is formed with openings in which steel balls 20a are loosely supported, the diameter of the balls being greater than the width of the wall of the carrier 20 so that the peripheries of the balls extend beyond the plane of the outer side of the carrier. Thus the balls provide a locking connection between the wedge portion of the socket and the post 16 whenever they are so disposed that the wedged portion forces the balls against the post 16. This occurs when the balls are disposed sufficiently low in relation to the wedge portion as to be clamped between said wedge portion and post 16. The expansion spring 21 has one terminal thereof against the flange 13 and the other terminal against the shoulder 26 of the ball carrier 20 so that the balls 21a are normally urged into locking engagement with the wedge portion 19 and the post 16.

The ball carrier 20 is formed with an inner flange 27 with which the flange 28 of the ball carrier actuating member 22 makes actuating contact. The manipulating ring 29 facilitates manual engagement of the member 22.

A removable clamping bar 30 having binder posts 31 and 32 serves to accommodate the variance in thicknesses of the sheets to be held in the binder.

The operation of the binder is known to the art, post 16 sliding into the ball carrier 20 without resistance caused by the balls 20a but when the post 16 is pulled in the opposite direction the balls 20a are brought into gripping engagement with the wedge portion 19 and such pulling movement is resisted. Thus the respective cover members are locked against relative outward displacement or disengagement.

Release of the locking member is effected by lifting the ball carrier against the action of the spring 21 so that the balls 20a are released from their clutching action. The ball carrier operating member 22 performs this function, the manipulating ring 29 facilitating its use.

It will be noted that the locking mechanism cannot jam as outlined in the objects of the invention. A blow received by the member 22 will cause it to descend to the extent shown in broken lines in Fig. 2, but before the force can be transmitted to the ball carrier, the manipulating ring 29 will meet the flange 13 and further downward motion of the member 22 will be prevented. Thus, during downward movement of the member 22, it is maintained free of the ball carrier 20 but during upward movement its flange 28 meets the flange 27 of the ball carrier to effect the releasing action.

If a number of binders are stacked together or if otherwise a substantial weight rests on the covers which weight is transmitted to the member 22, there will be no jamming because the member 22 will similarly descend to the broken line position of Fig. 2 and the ring 29, in conjunction with the flange 13 will isolate such weight from the ball carrier. In any event, no force other than the regulated force of the spring 21 acts upon the ball carrier and the danger of jamming is thus eliminated.

I have shown a preferred embodiment of my invention but it is obvious that numerous changes and omissions can be made without departing from its spirit.

I claim:

1. The combination with a loose leaf binder having a pair of cover members, a socket provided with a wedge portion connected to one of said cover members and a locking post connected to the other of said members, of locking mechanism comprising a ball carrier slidable in said socket, said ball carrier being hollow to receive said post and having a flange at one end thereof and a plurality of balls at the other end thereof for effecting a clutching action between said post and said wedge portion, a spring urging said ball carrier and balls into clutching engagement and means to lift said ball carrier against the action of said spring to de-clutch said post and said wedge portion, said lifting means comprising an externally accessible operating member slidable in said socket, a flange on the lower end of said operating member for engaging said flange of said ball carrier when said operating member is lifted and said operating member being slidable independent of said ball carrier when downwardly directed, and means to limit the downward sliding movement of said operating member.

2. The combination with a loose leaf binder having a pair of cover members, a socket provided with a wedge portion connected to one of said cover members and a locking post connected to the other of said members, of locking mechanism for said post and wedge portion of said socket, said locking mechanism comprising a ball carrier slidable in said socket, said ball carrier being hollow to receive said post and having an inward flange at one end thereof and a plurality of balls at the other end thereof for effecting a clutching action between said post and said wedge portion, a spring urging said ball carrier and balls into clutching engagement and means to lift said ball carrier against the action of said spring to de-clutch said post and said wedge portion, said lifting means comprising an externally accessible operating member slidable in the upper flanged end of said ball carrier, an outward flange on the lower end of said operating member for engaging said ball carrier by the contact of the respective flanges when said operating member is lifted, said ball carrier being independent of said operating member when said operating member is downwardly directed in respect to said ball carrier.

3. The combination with a loose leaf binder having a pair of cover members, flanges on said cover members, a socket provided with a wedge portion connected to one of said cover member flanges, and a locking post connected to the other of said cover member flanges, of locking mechanism for said post and wedge portion of said socket, said mechanism comprising a ball carrier slidable in said socket, said ball carrier being hollow to receive said post and having an inward flange at one end thereof and a plurality of balls at the other end thereof for effecting a clutching action between said post and said wedge portion, a spring urging said ball carrier and balls into clutching engagement and means to lift said ball carrier against the action of said spring to de-clutch said post and said wedge portion, said lifting means comprising an operating member slidable in the upper flanged end of said ball carrier, an outward flange on the lower end of said operating member for engaging said ball carrier by the contact of the respective flanges when said operating member is raised, the upper end of said operating member extending and protruding above the flange of the adjacent cover member, and a manipulating ring connected to said protruding end of said operating member, said manipulating ring enabling said operating member to be lifted thereby engaging said ball carrier, said manipulating member limiting the downward movement of said operating member within said ball carrier.

JAMES P. GUINANE.